United States Patent
Pinkerton et al.

(10) Patent No.: US 7,886,083 B2
(45) Date of Patent: Feb. 8, 2011

(54) OFFLOADED NEIGHBOR CACHE ENTRY SYNCHRONIZATION

(75) Inventors: James T. Pinkerton, Sammamish, WA (US); Sanjay N. Kaniyar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/218,041

(22) Filed: Aug. 31, 2005

(65) Prior Publication Data

US 2007/0083638 A1    Apr. 12, 2007

(51) Int. Cl.
G06F 3/00    (2006.01)
G06F 15/173    (2006.01)

(52) U.S. Cl. .............................. 710/17; 710/18; 710/19; 709/221; 709/223; 709/224; 715/736

(58) Field of Classification Search .................. None
See application file for complete search history.

(56) References Cited

U.S. PATENT DOCUMENTS

| | | | |
|---|---|---|---|
| 2001/0022823 A1 * | 9/2001 | Renaud | 375/359 |
| 2003/0204634 A1 | 10/2003 | Pinkerton et al. | |
| 2004/0221046 A1 * | 11/2004 | Heinonen et al. | 709/227 |
| 2005/0251603 A1 * | 11/2005 | Ishii et al. | 710/110 |

OTHER PUBLICATIONS

T.Narten et al, Neighbor Discovery for IP version 6 (IPv6), Dec. 1998, Network Working Group, pp. 1-93.*
Narten et al., "Neighbor Discovery for IP Version 6 (IPv6)," *Network Working Group*, Request for Comments 2461, pp. 1-93 (Dec. 1998).
Plummer, David C., "An Ethernet Address Resolution Protocol," *Network Working Group*, Request for Comments 826 (Nov. 1982).

* cited by examiner

*Primary Examiner*—Eron J Sorrell
*Assistant Examiner*—Dean Phan
(74) *Attorney, Agent, or Firm*—Wolf, Greenfield & Sacks, P.C.

(57) ABSTRACT

A method for the synchronization of network neighbor reachability between a host networking stack and a peripheral device, which offloads one or more network protocols is provided. The network neighbor reachability represents the reachability of another computer on the network. This invention enables conventional neighbor reachability to be extended to seamlessly support some network connections to a specific remote host to be offloaded to a peripheral device, while other network connections are not.

15 Claims, 8 Drawing Sheets

OFFLOADED NEIGHBOR CACHE ENTRY SYNCHRONIZATION

FIELD OF THE INVENTION

The present invention relates generally to protocol offloading and, more particularly, to synchronization of offloaded protocol state.

BACKGROUND OF THE INVENTION

An invention described in commonly assigned United States Patent Publication 2003/0204634 provides a method to offload a communication protocol stack, such as a transmission control protocol (TCP) based protocol stack. Data that would normally be sent through a host NDIS (network driver interface specification) path that has multiple software layers to a network interface, is offloaded to a path that includes a switch layer and an offload target. The offload target is conventionally a peripheral device that includes a second processor that processes the offloaded network stack connection in hardware, software, or a combination of both. Tight synchronization with the host network stack and processing unit is required. A request to offload the stack is sent through the NDIS path to the offload target. The request includes a list of resource requirements so that the offload target has the information needed to allocate resources. Each layer in the NDIS path adds its resource requirements to the list. If the offload target accepts the request, the offload target allocates resources and sends an offload handle to each of the software layers so that the software layers can communicate with the offload target.

Once the offload target's acceptance of the offload is communicated to the software layer, the state for each software layer is sent to the offload target. Alternatively, the state may be sent with the offload request, with only changes to the state later sent to the offload target. Each state has state variables and each state variable may be classified as a constant variable, a cached variable, or a delegated variable. The constant variables do not change during the time the protocol stack is offloaded. Cached variables are managed by the CPU and updated in the offload target if they change. Delegated variables are handled by the offload target.

However, because the protocol stack is offloaded to the offload target for only specific connections, the host protocol stack and the offload target may communicate with neighbor peers without the other knowing about it. This means that the host protocol stack might improperly invalidate a neighbor cache entry because there had been no forward progress in the host protocol stack. It might be the case that there has been forward progress on the offloaded connection, making the invalidation of the neighbor cache entry improper.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In view of the foregoing, the present invention provides for synchronization of network neighbor cache entry state, such as reachability, between a host networking stack and a peripheral device, which offloads one or more network protocols. Network neighbor reachability represents the reachability of another computer on the network. This invention enables conventional neighbor reachability to be extended to seamlessly support offloading of some network connections to a peripheral device, while other network connections are maintained by the host. The method may include determining a host reachability delta, that is, the time difference between a current host time and a time that neighbor reachability was last confirmed by the host. When the HRD exceeds a threshold, the host stack may query the offload target for a device reachability delta, that is, the time difference between a current offload target time and a time that neighbor reachability was last confirmed by the offload target. The method may determine the state of the neighbor state object based on the DRD received from the offload target. With this method, the neighbor reachability state of a neighbor on the network may be distributively maintained by the host networking stack and the offload target.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

Figure 1A:
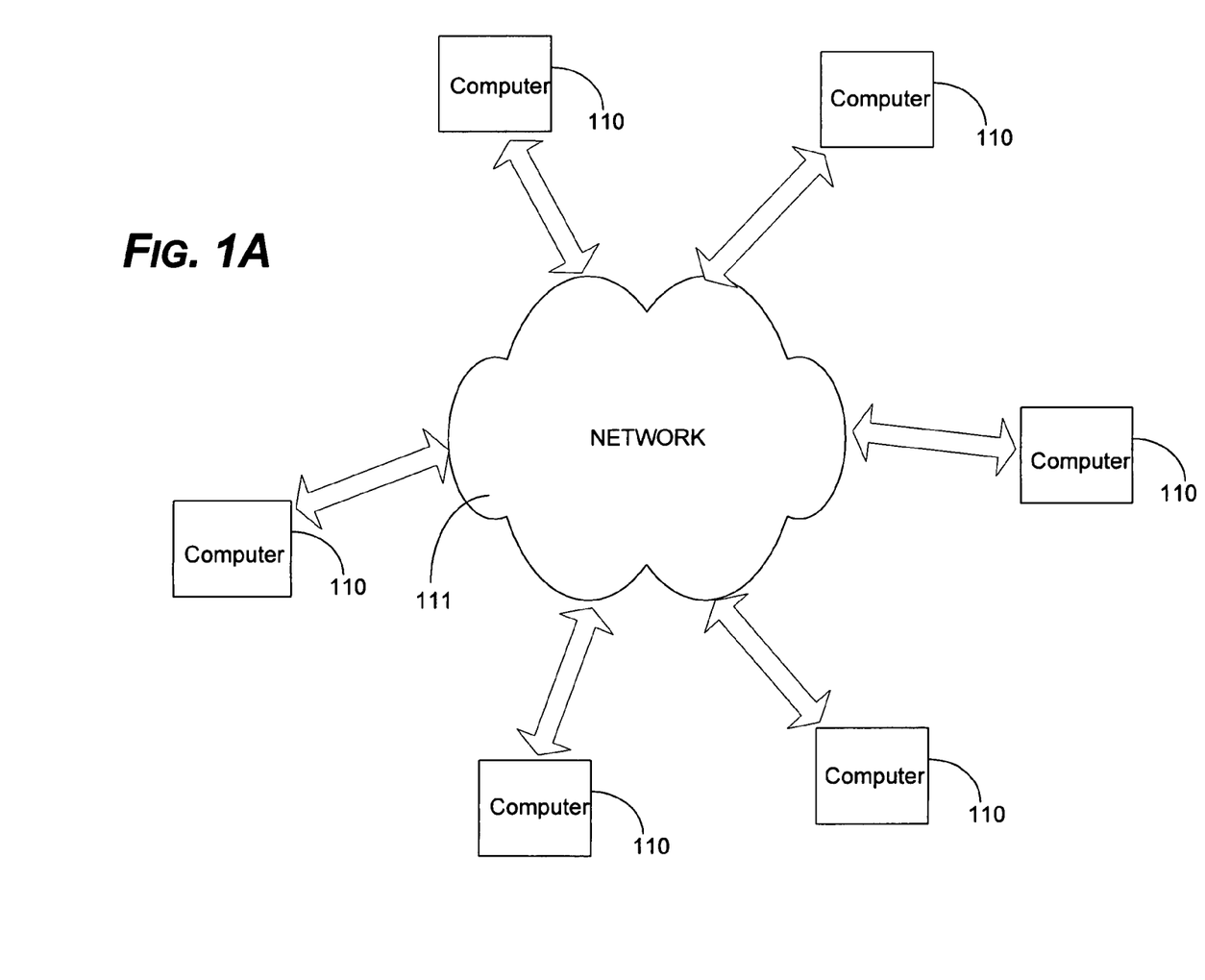
FIG. 1A is a schematic generally illustrating an exemplary network environment across which the present invention operates.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, quarantine servers, peers, or other types of computers with respect to other computers. Accordingly, the various embodiments of the invention may be practiced on clients, network servers, quarantine servers, peers, other types of computers, or combinations thereof, even though specific examples contained herein do not refer to all of these types of computers.

Figure 1B:
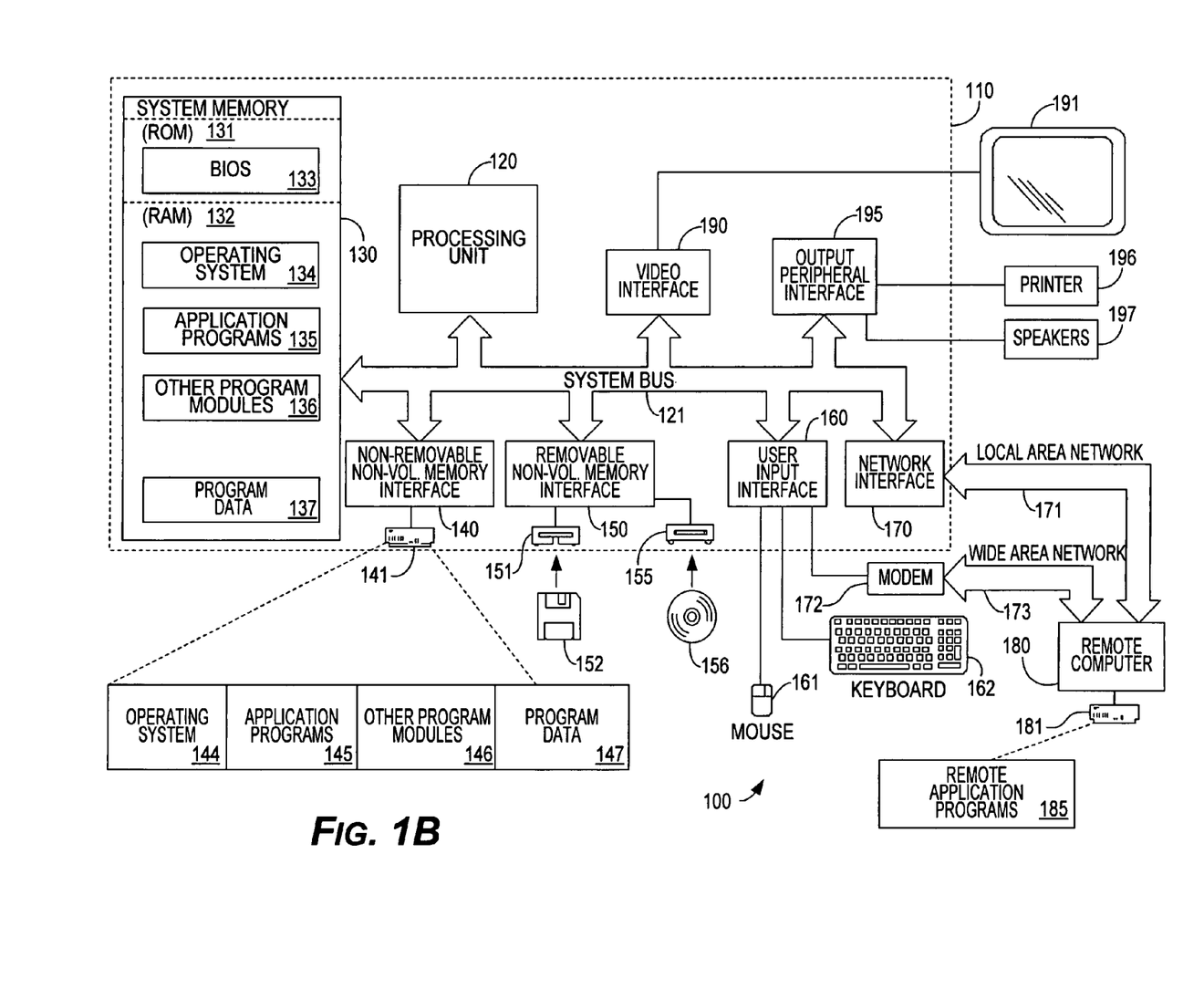
FIG. 1B is a block diagram generally illustrating an exemplary computer system on which the present invention resides.

FIG. 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, mobile phones, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1B, an exemplary system for implementing the invention includes a general-purpose computing device in the form of a computer 110, which may act as a client, network server, quarantine server, peer, or other types of computers within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 may operate in a networked environment using logical connections to one or more remote computers, such as a remote computer 180. The remote computer 180 may be another personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks, such as wireless networks. Such networking environments are commonplace in offices, enterprise-wide computer networks, intranets, and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In an embodiment of the invention, a mechanism is provided for synchronizing the neighbor cache entry states of a host stack and an offloaded target, such as a network interface card (NIC) with associated device drivers. The network interface 170 may include the NIC and associated device drivers. Helpful context and details with respect to neighbor cache entries (NCEs), as described in Narten et al., "Neighbor Discovery for IP Version 6 (IPv6)," Request for Comments (RFC) 2461 promulgated by the Internet Engineering Task Force (IETF) in December 1998, are described below.

Neighbor Cache Entries

Communication to or through a neighbor may fail for numerous reasons at any time, including hardware failure, hot-swap of an interface card, etc. If the destination has failed, no recovery is possible and communication fails. On the other hand, if it is the communications path that has failed, recovery may be possible. Thus, a node actively tracks the reachability "state" for the neighbors to which it is sending packets. By way of example and not limitation, the description of the invention uses examples of how states are maintained using IPv6. Those of ordinary skill in the art will understand that the examples may be mapped to examples using IPv4. For example, the Neighbor Solicitation message roughly maps to the ARP Request message and the Neighbor Advertisement message roughly maps to the ARP Reply message.

A neighbor is considered reachable if the node has recently received a confirmation that packets sent recently to the neighbor were received by its IP layer. Positive confirmation can be gathered in two ways: hints from upper layer protocols that indicate a connection is making "forward progress", or receipt of a Neighbor Advertisement message that is a response to a Neighbor Solicitation message. A connection makes "forward progress" if the packets received from a remote peer can only be arriving if recent packets sent to that peer are actually reaching it. In a transmission control protocol (TCP), for example, receipt of an acknowledgement, which advances the left-hand side of the TCP window, indicates that previously sent data reached the peer. Likewise, the arrival of new (non-duplicate) data indicates that earlier acknowledgements are being delivered to the remote peer. If packets are reaching the peer, they must also be reaching the sender's next-hop neighbor; thus "forward progress" is a confirmation that the next-hop neighbor is reachable.

In some cases (e.g., user datagram protocol or UDP based protocols, and routers forwarding packets to hosts) such reachability information may not be readily available from upper-layer protocols. When no hints are available and a node is sending packets to a neighbor, the node actively probes the neighbor using unicast (as opposed to broadcast) Neighbor Solicitation messages to verify that the forward path is still working.

A Neighbor Cache entry (NCE) may be in one of five states:

INCOMPLETE: Address resolution is being performed on the entry. Specifically, a Neighbor Solicitation has been sent to the solicited-node multicast address of the target, but the corresponding Neighbor Advertisement has not yet been received.

REACHABLE: Positive confirmation was received within the last ReachableTime that the forward path to the neighbor was functioning properly. While REACHABLE, no special action takes place as packets are sent.

STALE: More than ReachableTime have elapsed since the last positive confirmation was received that the forward path was functioning properly. While stale, no action takes place until a packet is sent. The STALE state is entered upon receiving an unsolicited Neighbor Discovery message that updates the cached link-layer address. Receipt of such a message does not confirm reachability, and entering the STALE state insures reachability is verified quickly if the entry is actually being used. However, reachability is not actually verified until the entry is actually used.

DELAY: More than ReachableTime have elapsed since the last positive confirmation was received that the forward path was functioning properly, and a packet was sent within the last DELAY_FIRST_PROBE_TIME seconds. If no reachability confirmation is received within DELAY_FIRST_PROBE_TIME seconds of entering the DELAY state, send a Neighbor Solicitation and change the state to PROBE. The DELAY state is an optimization that gives upper-layer protocols additional time to provide reachability confirmation in those cases where ReachableTime have passed since the last confirmation due to lack of recent traffic. Without this optimization the opening of a TCP connection after a traffic lull would initiate probes even though the subsequent three-way handshake would provide a reachability confirmation almost immediately.

PROBE: A reachability confirmation is actively sought by retransmitting Neighbor Solicitations every RetransTimer until a reachability confirmation is received.

Neighbor Unreachability Detection operates in parallel with the sending of packets to a neighbor. While reasserting a neighbor's reachability, a node continues sending packets to that neighbor using the cached link-layer address. If no traffic is sent to a neighbor, no probes are sent. When a node needs to perform address resolution on a neighboring address for the first time (after a time-out), it creates an entry in the INCOMPLETE state and initiates address resolution. If address resolution fails, the entry should be deleted, so that subsequent traffic to that neighbor invokes the next-hop determination procedure again. Invoking next-hop determination at this point insures that alternate default routers are tried.

When a reachability confirmation is received (either through upper-layer advice or a solicited Neighbor Advertisement) an entry's state changes to REACHABLE. When a ReachableTime period has passed since receipt of the last reachability confirmation for a neighbor, the Neighbor Cache entry's state changes from REACHABLE to STALE. The first time a node sends a packet to a neighbor whose entry is STALE, the sender changes the state to DELAY and a sets a timer to expire in DELAY_FIRST_PROBE_TIME seconds. If the entry is still in the DELAY state when the timer expires, the entry's state changes to PROBE. If reachability confirmation is received, the entry's state changes to REACHABLE.

Upon entering the PROBE state, a node sends a unicast Neighbor Solicitation message to the neighbor using the cached link-layer address. While in the PROBE state, a node retransmits Neighbor Solicitation messages after every RetransTimer period until reachability confirmation is obtained. Probes are retransmitted even if no additional packets are sent to the neighbor. If no response is received after waiting the RetransTimer period after sending the MAX_UNICAST_SOLICIT solicitations, retransmissions cease and the entry should be deleted. Subsequent traffic to that neighbor will recreate the entry and performs address resolution again.

A Neighbor Cache entry enters the STALE state when created as a result of receiving packets other than solicited Neighbor Advertisements (i.e., Router Solicitations, Router Advertisements, Redirects, and Neighbor Solicitations). These packets contain the link-layer address of either the sender or, in the case of Redirect, the redirection target. However, receipt of these link-layer addresses does not confirm reachability of the forward-direction path to that node. Placing a newly created Neighbor Cache entry for which the link-layer address is known in the STALE state provides assurance that path failures are detected quickly. In addition, should a cached link-layer address be modified due to receiving one of the above messages the state should also be set to STALE to provide prompt verification that the path to the new link-layer address is working.

Offloaded TCP Connections

When, for example, a TCP connection is offloaded, the state maintenance of the Neighbor Cache entry is distributed between the host stack and the offload target. Salient details of TCP chimney offload, an example of a suitable offload technique, are described below with reference to FIG. 2.

Figure 2:
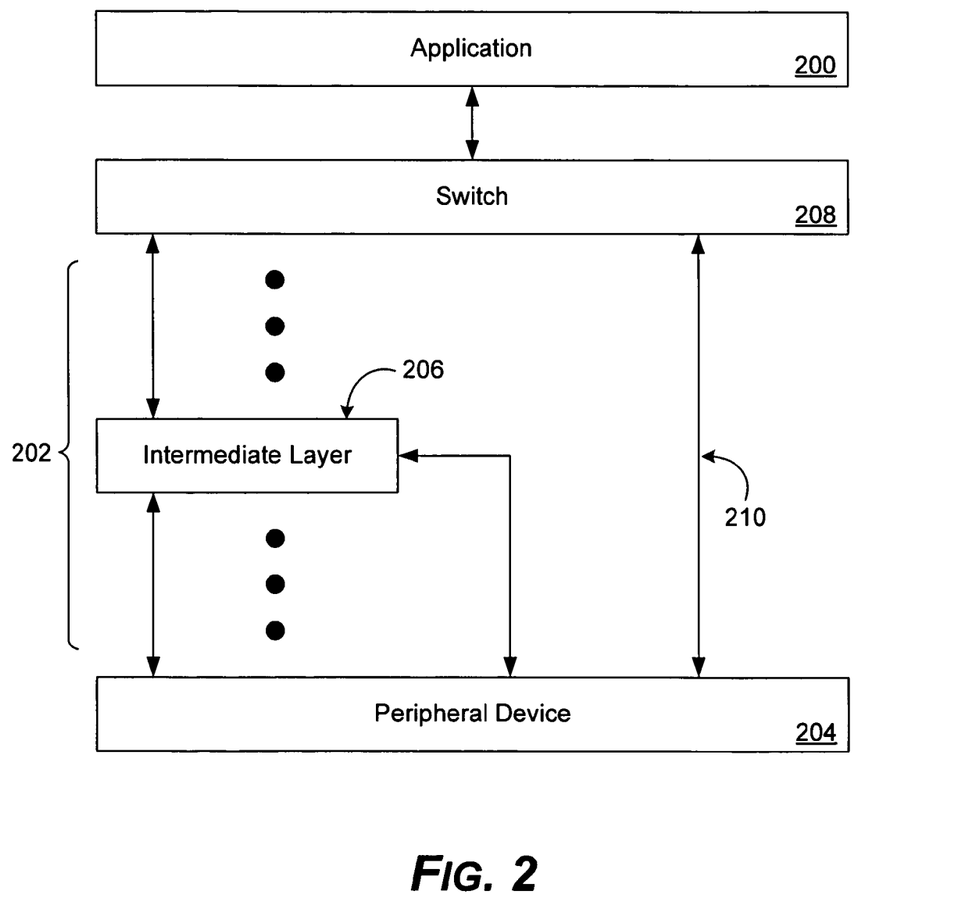
FIG. 2 is a block diagram illustrating the functional layers of the NDIS path and the bypass path in accordance with an embodiment of the invention.

FIG. 2 illustrates the interrelationship of some of the components that make up a networking model and the components of the present invention. During normal operation, networked messages are sent by the application 200 through network stack 202 to the offload target 204 where the messages are sent to other devices and applications on the network and received from the other devices and applications. The network stack 202 includes one or more intermediate software layers 206. Data sent from application 200 travels through the intermediate software layer(s) 206 where specific operations may be performed on the data such as packaging the data, reliable data transmission, data encryption and calculation of a message digest.

Switch 208 is used to offload the processing unit 120 from performing network stack operations for the intermediate software layer(s) 206. While the switch 208 is shown separately, it should be noted that the switch 208 may be integrated into the top intermediate layer of the network stack 202. Data is sent to the offload target 204 via chimney 210 for the offload target 204 to perform network stack operations. In this hierarchy, the intermediate software layers do not have to exclusively reside in the host or the offload target and it allows any of the intermediate layers to either be completely offloaded, to remain in the host, or a combination of both (e.g., offload one or more specific connections). Additionally, chimneys may be layered on top of chimneys (e.g., an IPSEC chimney may be layered on top of a TCP chimney). A connection may be any combination of reliable and unreliable data transfer and unicast or multicast data transfer. If an intermediate layer remains in the host, the host updates cached variables (as described below) in the offload target 204. For example, a transport control block (TCB) state entry for a connection can be offloaded for the transport layer with a route cache entry (RCE) for the network layer offloaded to the offload target 204. The switch 208 continues to send traffic for a different TCB through the network stack 202 that shares the same RCE while the switch 208 sends traffic through the chimney 210 for the offloaded TCB.

The switch 208 initiates the offload by sending the intermediate layer(s) 206 an offload request. The offload request includes resource information that helps the offload target 204 decide whether it can successfully offload the connection. Each intermediate layer 206 either refuses the offload request or adds resource information to the offload request and sends the offload request to the adjacent software layer in the network stack 202. When the offload target 204 receives the offload request, it calculates whether it has resources available to offload the connection. The offload target 204 refuses the offload request if the offload is not possible. Otherwise, the offload target 204 accepts the offload request and allocates resources for the connection. The offload target 204 completes the offload request by sending a completion message having a linked list of parameters to the intermediate software layer(s) 206. The linked list of parameters provides information to the intermediate software layer(s) 206 and switch 208 to allow the intermediate software layer(s) 206 and switch 208 to communicate with the offload target. Each intermediate software layer 206 removes information for its layer from the linked list of parameters.

When an intermediate layer 206 receives the completion message for offloading, the intermediate layer 206 passes its state to the offload target 204. Each state may have three types of variables: CONST, CACHED, and DELEGATED. A state may have all three types of variables or a subset of the three types of variables. CONST variables are constants that do not change during the life of the offloaded connection. They are not read back to the layers when the connection is uploaded. The host processing unit 120 maintains ownership of CACHED variables and ensures that any changes to a CACHED variable in the host processing unit 120 are updated in the offload target 204. Control messages that change the CACHED state are handled by the network stack 202. As a result, the host will write but does not need to read back the CACHED variables when the connection is uploaded. The host processing unit 120 transfers ownership of DELEGATED variables to the offload target 204. The DELEGATED variables are written once when the offload occurs and are read back when the offload is terminated. By only transferring back the DELEGATED variables, the overhead of transferring the connection back to the host is minimized. State that must be shared (e.g. controlled) between the network stack 202 and the offload target 204 that for various performance reasons is being offloaded (i.e., delegated) is cleanly divided between the network stack 202 and chimney 210 (e.g., IP address in TCP offloads) such that both the network stack 202 and offload target 204 each owns an exclusive portion of the state. The host processing unit 120 queries the offload target 204 for DELEGATED variables when needed (e.g., for statistics). The host processing unit 120 may also query CONST or CACHED variables for diagnostics. Dividing the state into three categories enables the network stack 202 to coexist cleanly with the chimney 210. It should be noted that the state may be included in the offload request. This can be done if either the state does not contain delegated state variables or contains delegated state variables that will not change between the initial offload request and the completion of the offload request.

Multiple connections may be off-loaded by an intermediate software layer 206 to the offload target 204. A reference counter is maintained by the intermediate software layer 206 of the number of upper layer state objects (i.e., state objects of layers above the intermediate software layer 206) which reference the intermediate software layer's state object for offload. A state object as used herein is a collection of state variables for a particular layer that are categorized as CONST, CACHED, or DELEGATED as used herein. If an intermediate layer's offloaded state object has no references to it by a layer above it, the intermediate layer 206 may send a message to the offload target 204 to upload the state object for the intermediate layer 206 and send delegated state variables to the intermediate layer 206. The offload target 204 packages the delegated state variables and passes them to the intermediate layer 206, and then deletes the state object for the intermediate layer 206. The intermediate layer 206 sends a completion message to the switch 208.

Figure 3:
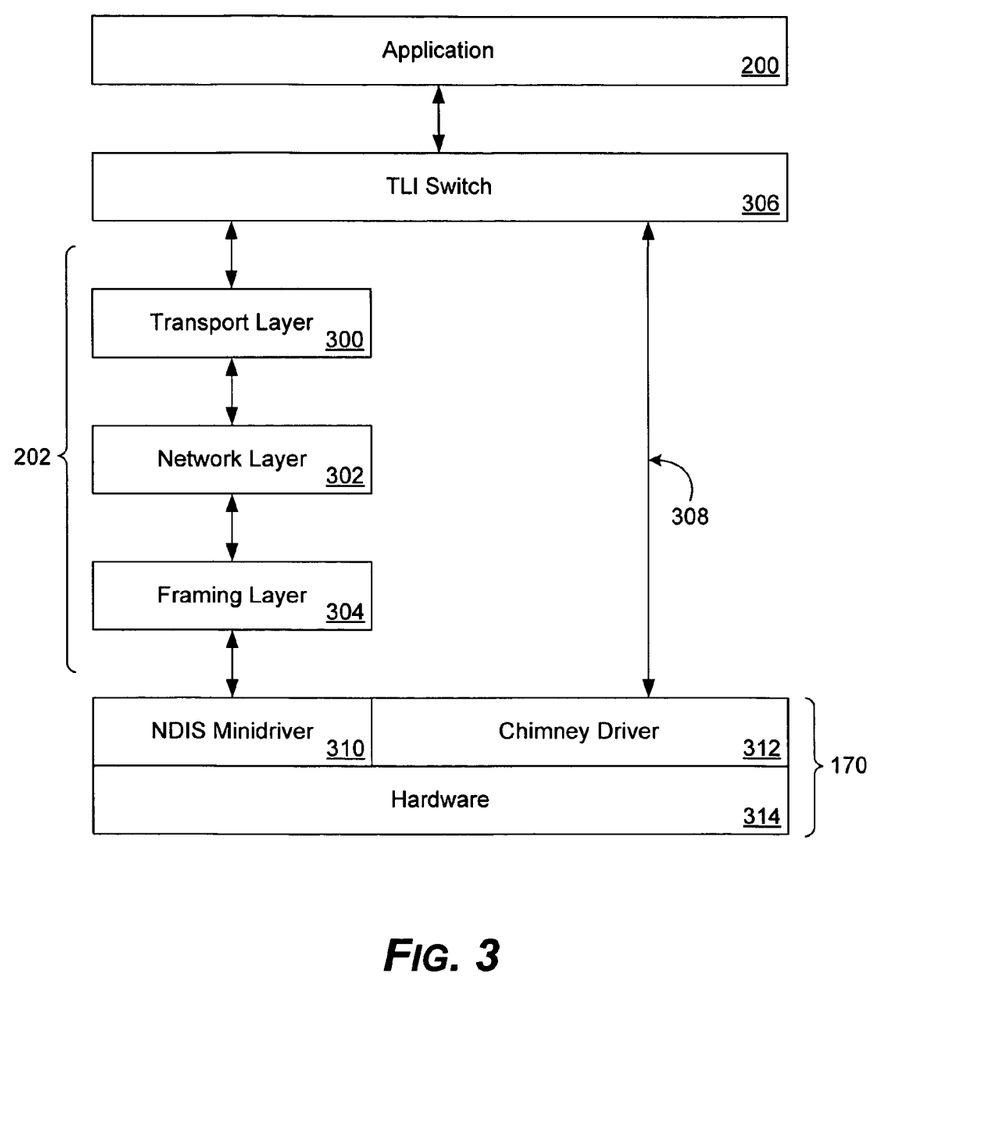
FIG. 3 is a ladder diagram illustrating the offload mechanism in accordance with an embodiment of the invention.

Turning now to FIG. 3, details of the invention will be described, by way of example and not limitation, in an embodiment where the offload target 204 is NIC 170, the switch 208 is a transport layer interface (TLI) switch 306, and the network stack 202 comprises a transport layer 300, a network layer 302, and a framing layer 304. Network layer 302 is also known as a path layer and the framing layer 304 is also known as a neighbor layer.

Networked messages are sent by the application 200 through network stack 202 to the NIC 170 during operation. Data sent from the application 200 travels through the TLI switch 306, which controls whether the data goes down the host based network stack 202 or the chimney 308. Note that the TLI switch 306 may be incorporated into the transport layer 300. The software layers in the network stack 202 receive data from the application 200, package it in a packet form and send it to the offload target hardware 314 via NDIS minidriver 310. Other tasks the network stack 202 may perform as a data packet passes through the stack 202 includes data encryption, reliable data transmission, and calculation of a message digest (e.g., checksum or CRC for the data packet). Many of these tasks are performed by the processing unit 120 and are processor intensive.

The TLI switch 306 is used to offload the processing unit 120 from performing stack operations by sending data for connections to the NIC 170 via chimney 308 (and chimney driver 312). Those skilled in the art will recognize that the upper edge of NDIS minidriver 310 and chimney driver 312 may be the NDIS application programming interface (API) in a Microsoft® Windows® operating system.

Communications between computers 110 (FIG. 1) has become a basic service underlying many applications. As a result, performance has become significant and mechanisms such as communication protocol stack offloading provide performance enhancement. However, the performance enhancement may be lost, for example, if synchronization between the host and offload target is inefficient. Accordingly, some conventional object state synchronization systems and methods are suboptimal. Example steps for object state synchronization in accordance with an embodiment of the invention are described below with reference to FIGS. 4, 5, 6 and 7.

At step 402 (FIG. 4), a request to send a communication packet (e.g., a TCP/IP packet) may be received, for example, by the chimney driver 312 (FIG. 3) of the sending host. In this example, some or all of the protocol stack has been offloaded to an offload target such as the communication hardware 314. As a result, communications object state associated with CACHED variables may diverge and synchronization is necessary. In this example, in contrast with inefficient brute resynchronization or timer-driven resynchronization, synchronization is event-driven and "lazy," that is, unnecessary synchronization is deferred.

Figure 4:
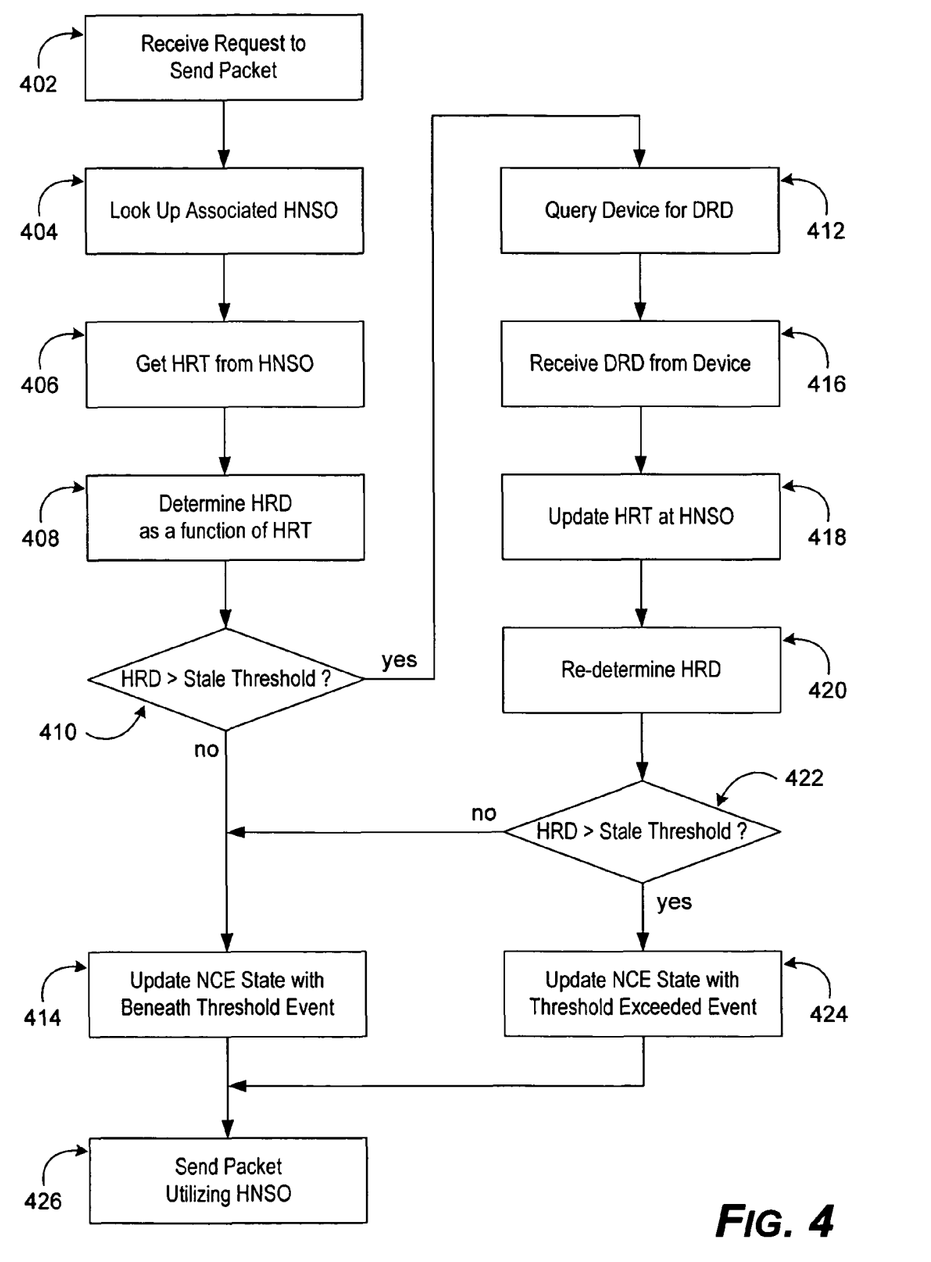
FIG. 4 is a flow diagram depicting example steps that may be performed by a host to synchronize an offloaded neighbor cache entry in accordance with an embodiment of the invention.

Although each embodiment of the invention is not so limited, for clarity, this example synchronizes a neighbor state object (NSO) associated with a neighbor cache entry (NCE) as well as one or more communication connections. Since the protocol stack has been offloaded, in an embodiment of the invention, versions of the neighbor state object are maintained by the host and the offload target. These versions are called the host neighbor state object (HNSO) and the device neighbor state object (DNSO) respectively. At step 404, a lookup operation may be performed to determine (and/or obtain reference to) the host neighbor state object associated with the communication connection over which the communication packet is to be sent.

Each version of the neighbor state object may maintain one or more of: a host reachability time (HRT), a device reachability time (DRT), a host reachability delta (HRD) and a device reachability delta (DRD). The host reachability time may correspond to a time at which the host last received information confirming that a destination associated with the communication connection was reachable. For example, the host reachability time may be a timestamp corresponding to a TCP acknowledgement (ACK) packet received from the destination. The host reachability delta may be the difference between the host reachability time and a current time. The host reachability delta may be computed dynamically or updated at need. Similarly, the device reachability time may correspond to a time at which the offload target last received information confirming that the destination was reachable, and device reachability delta may be the different between the device reachability time and the current time.

At step 406, the host reachability time may be retrieved from the host neighbor state object. At step 408, the host reachability delta may be determined as a function of the host reachability time retrieved at step 406. For example, the host reachability delta may be determined by subtracting the host reachability time from the current time at the host. In some embodiments of the invention, a linear or nonlinear scaling function may, in addition, be applied to the host reachability time and/or the host reachability delta, for example to compensate for differences between the clocks of the host and the offload target.

At step 410, the host reachability delta determined at step 408 may be compared to a reachability stale threshold. For example, the reachability stale threshold may be a system wide constant and have value 10 seconds. If the host reachability delta is greater than the reachability stale threshold, the procedure may progress to step 412 to check with the offload target device with respect to information received from the neighbor. Otherwise, the procedure may progress to step 414 to perform any neighbor cache entry state updates and send the communication packet without further delay.

Although step 410 may determine that the host reachability delta is greater than the reachability stale threshold, it may be that the offload target has received verification of reachability from the neighbor and that it is the host neighbor state object that is stale. To check for this case, at step 412, the offload target device may be queried for the device reachability delta maintained by the device neighbor state object. At step 416, the device reachability delta may be received from the offload target device.

At step 418, the host reachability time maintained by the host neighbor state object may be updated as a function of the device reachability delta received at step 416. For example, the host reachability time may be set to the most recent of: (a) the current host reachability time; and (b) the current time less the device reachability delta. In symbols: HRT=max(HRT, current_time−DRD). Following step 418, in an embodiment of the invention, the host reachability time maintained by the host neighbor state object has been updated to include the most current information available from both the host and the offload target.

At step 420, the host reachability delta may be re-determined in a manner corresponding to that of step 408. At step 422, the re-determined host reachability delta may be compared to the reachability stale threshold. If the re-determined host reachability delta is greater than the reachability stale threshold, the procedure may progress to step 424 to update the neighbor cache entry state with a threshold exceeded event. Otherwise, the offload target did have more recent evidence of destination reachability and the procedure may progress to step 414 to update the neighbor cache entry state with a beneath threshold event.

At step 424, the neighbor cache entry state may be updated with a threshold exceeded event, for example, in accordance with RFC 2461. Depending on the current neighbor cache entry state, the neighbor cache entry state may or may not change in response to the threshold exceeded event. For example, if the current neighbor cache entry state is REACHABLE, then the neighbor cache entry state may change to STALE in response to the threshold exceeded event, however if the current neighbor cache entry state is PROBE, then the neighbor cache entry state may not change in response to a particular threshold exceeded event.

Similarly, at step 414, the neighbor cache entry state may be update with a beneath threshold event, for example, in accordance with RFC 2461. Again, depending the current neighbor cache entry state, the neighbor cache entry state may or may not change in response to the beneath threshold event. For example, if the current neighbor cache entry state is STALE, DELAY or PROBE, then the neighbor cache entry state may change to REACHABLE in response to the beneath threshold event, however if the current neighbor cache entry state is REACHABLE, then the neighbor cache entry state may not change in response to the beneath threshold event.

At step 426, the communication packet may be send to the destination utilizing the host neighbor state object as updated by the above steps.

Figure 5:
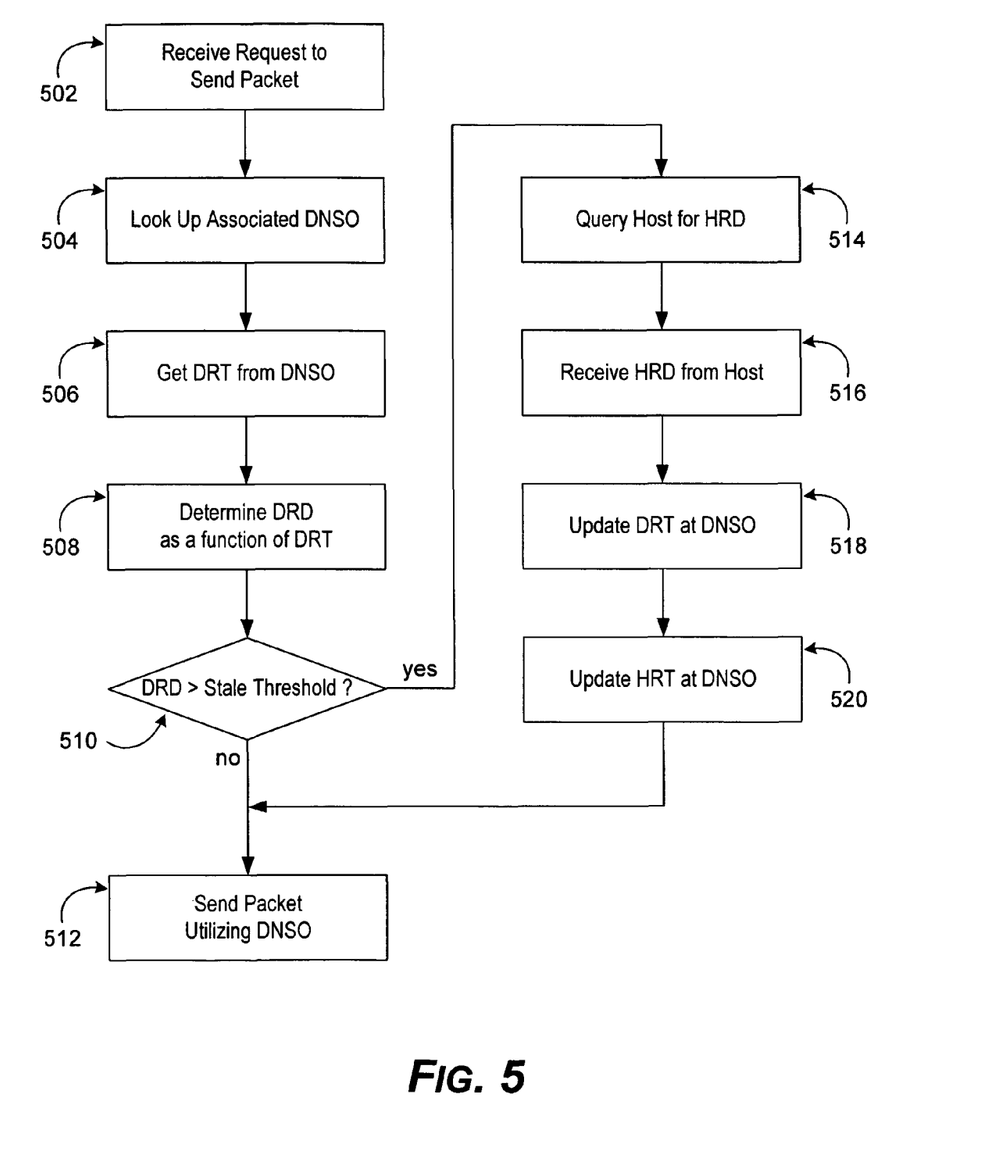
FIG. 5 is a flow diagram depicting example steps that may be performed by an offload target device to synchronize an offloaded neighbor cache entry in accordance with an embodiment of the invention.

The steps depicted by FIG. 4 include step 412 querying the offload target device in order to update the host neighbor state object. The steps depicted by FIG. 5 are complementary in that they include a query of the host in order to update the device neighbor state object. Significantly, the steps depicted by FIG. 5 do not include an update of a neighbor cache entry state maintained by the offload target device. This corresponds, in accordance with an embodiment of the invention, to an ability of the offload target device to be free of a duty to maintain a neighbor cache entry state machine.

At step 502, a request to send a communication packet (e.g., a TCP/IP packet) may be received by the offload target device communication subsystem. For example, the request may be generated by the offload target device as part of the communication protocol. As described above with reference to FIG. 4, in this example, some or all of the protocol stack has been offloaded to the offload target and, as a result, communications object state associated with CACHED variables such as host reachability time and device reachability time at the host and the offload target device may be out of synchronization with each other. First, several steps are performed to determine if a synchronization check is desirable.

At step 504, a lookup operation may be performed to determined and/or obtain reference to the device neighbor state object associated with the communication connection over which the communication packet is to be sent. At step 506, the device reachability time may be retrieved from the device neighbor state object. At step 508, the device reachability delta may be determined as a function of the device reachability time retrieved at step 506. For example, the device reachability delta may be determined by subtracting the device reachability time from the current time at the offload target device. In some embodiments of the invention, a linear or nonlinear scaling function may, in addition, be applied to the device reachability time and/or the device reachability delta, for example to compensate for differences between the clocks of the offload target device and the host.

At step 510, the device reachability delta determined at step 508 may be compared with the reachability stale threshold. For example, the reachability stale threshold may be the system wide constant described above with reference to FIG. 4 and may be provided by the host to the offload target device at device initialization time. If the device reachability delta is greater than the reachability stale threshold, synchronization with the host may be required and, in an embodiment of the invention, the procedure progresses to step 512. Otherwise, the procedure may progress to step 514 to send the communication packet without further delay.

At step 512, the host may be queried for the host reachability delta maintained by the host neighbor state object. At step 516, the requested host reachability delta may be received from the host. The response of the host to the query at step 512 and the value of the host reachability delta returned at step 516 in accordance with an embodiment of the invention is described below in more detail with reference to FIG. 6.

At step 518, the device reachability time maintained by the device neighbor state object may be updated as a function of the host reachability delta received at step 516. For example, the device reachability time may be set to the most recent of: (a) the current device reachability time; and (b) the current time less the host reachability delta. In symbols: DRT=max (DRT, current_time−HRD). Similarly, at step 520, the host reachability time maintained by the device neighbor state object may be updated as a function of the host reachability delta received at step 516. Following steps 518 and 520, in an embodiment of the invention, the device reachability time and the host reachability time maintained by the device neighbor state object has been updated to include the most current information available from both the host and the offload target.

At step 514, the communication packet may be send to the destination utilizing the device neighbor state object as updated by the above steps.

Figure 6:
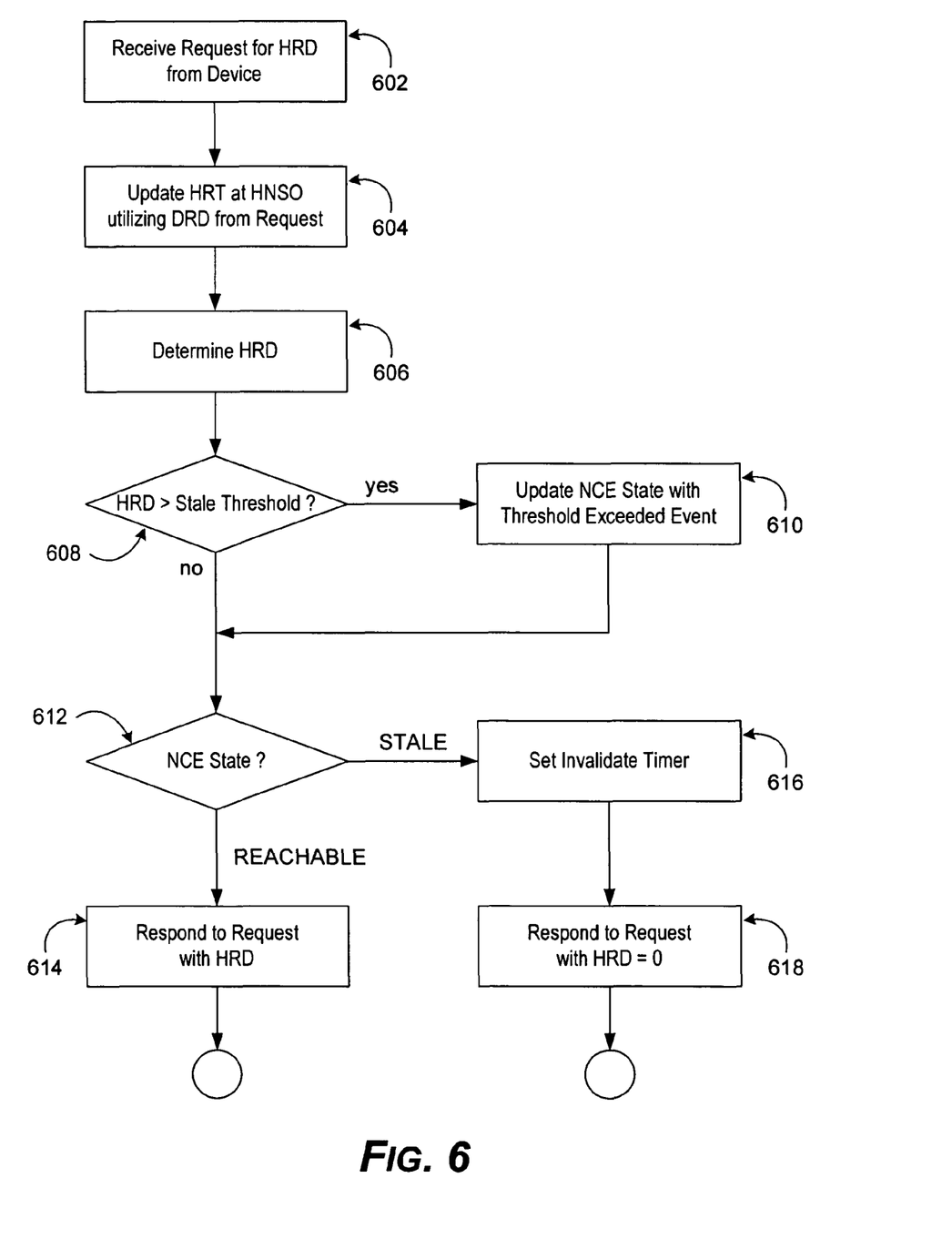
FIG. 6 is a flow diagram depicting example steps that may be performed by the host in response to a request from the offload target device in accordance with an embodiment of the invention.

Although the steps depicted in FIG. 5 do not explicitly include an update of a neighbor cache entry state, step 512 may trigger such an update at the host. FIG. 6 depicts example steps for responding to a query for host reachability delta in accordance with an embodiment of the invention. At step 602, the request for the host reachability delta maintain by the host neighbor state object may be received from the offload target device.

The incoming request for the host reachability delta may include a copy of the device reachability delta maintained by the device neighbor state object. At step 604, the host reachability time maintained by the host neighbor state object may be updated, for example, in a manner corresponding to that described above with reference to step 418 (FIG. 4). At step 606, the host reachability delta may be determined as a function of the updated host reachability time, for example, in a manner corresponding to that described above with reference to step 420.

At step 608, the host reachability delta determined at step 606 may be compared with the reachability stale threshold. If the host reachability data is greater than the reachability stale threshold, the procedure may progress to step 610 to adjust the neighbor cache entry state. Otherwise, the procedure may progress to step 612. At step 610, the neighbor cache entry state may be updated with a threshold exceed event, for example, as described above with respect to step 424 (FIG. 4).

At step 612, the neighbor cache entry state may be determined, for example, a stored value of the neighbor cache entry state associated with the communication connection may be retrieved. If the neighbor cache entry state is REACHABLE, the procedure may progress to step 614. Otherwise, the procedure may progress to step 616.

Figure 7:
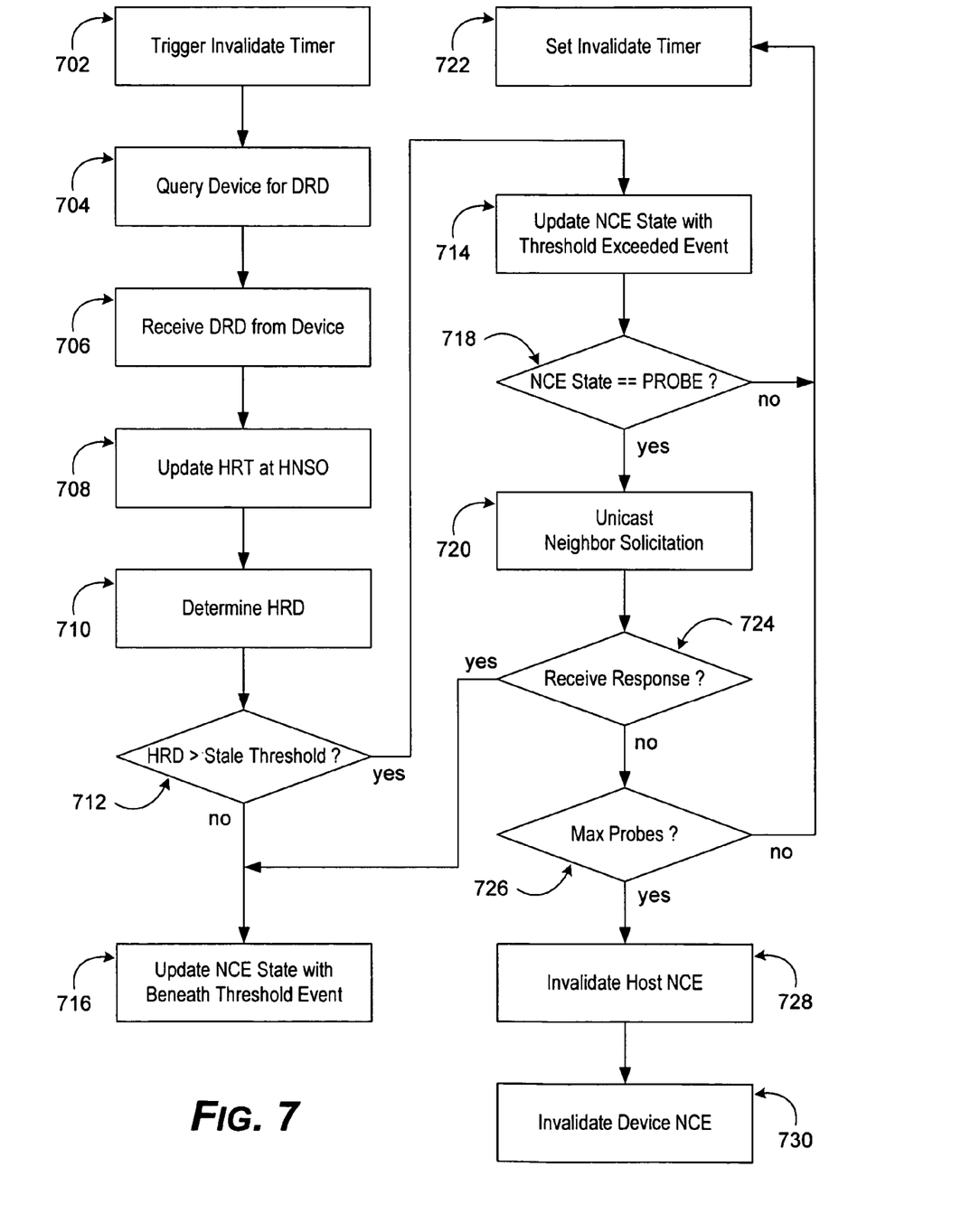
FIG. 7 is a flow diagram depicting example steps for servicing an invalidate timer in accordance with an embodiment of the invention.

At step 614, the host reachability delta determined at step 606 may be returned to the offload target device in response to the request. In an embodiment of the invention, the way that the host reachability time is updated at step 604 ensures that the host reachability delta returned at step 614 includes the most current information available from both the host and the offload target. At step 616, the most current information indicates that the neighbor cache entry has fallen out of the REACHABLE state, and may require invalidation. To check, an invalidate timer is set at 616. FIG. 7 depicts example steps for servicing the invalidate trigger in accordance with an embodiment of the invention. At step 618, a nonstandard host reachability delta value (e.g., zero) may be returned to the offload target device to prevent new host reachability delta requests for a time period of at least the reachability stale threshold (e.g., 10 seconds).

At step 702 (FIG. 7), the invalidate timer set at step 616 (FIG. 6) triggers in accordance with an embodiment of the invention. In order to ensure that the host neighbor state object is updated with the most current information available from both the host and the offload target, at step 704, the offload target device may be queried for the device reachability delta maintained by the device neighbor state object. At step 706, the device reachability delta may be received from the offload target device. At step 708, the host reachability time maintained by the host neighbor state object may be updated as a function of the device reachability delta received at step 706, for example, as described above with reference to step 418 (FIG. 4).

At step.710, the host reachability delta may be determined as a function of the updated host reachability time in a manner corresponding to that described above with reference to step 408 (FIG. 4). At step 712, the host reachability delta determined at step 710 may be compared to the reachability stale threshold. If the host reachability delta is greater than the reachability stale threshold, the procedure may progress to step 714 to update the neighbor cache entry state in accordance with a threshold exceeded event, for example as described above with reference to step 424. Otherwise the procedure may progress to step 716 to update the neighbor cache entry state in accordance with a beneath threshold event, for example, as described above with reference to step 414.

At step 718, it may be determined whether the neighbor cache entry state is PROBE. If the neighbor cache entry state is PROBE, the procedure may progress to step 720 to attempt to contact the neighbor. Otherwise, the procedure may progress to step 722 to reset the invalidate timer. At step 722, the invalidate timer may be reset so that the steps depicted in FIG. 7 can recur after a delay, eventually progressing to step 716 and/or step 720.

At step 720, a Neighbor Solicitation message may be unicast to the unreachable neighbor, for example, in accordance with RFC 2461. At step 724, a check may be made for a response to the Neighbor Solicitation message. If a response to the Neighbor Solicitation message is detected, then the procedure may progress to step 716 to update the neighbor cache entry state in accordance with a beneath threshold event since, in an embodiment of the invention, the response corresponds to recent evidence of neighbor reachability, that is, a low host and/or device reachability delta. Otherwise the procedure may progress to step 726.

At step 726, it may be determined if a maximum number of Neighbor Solicitation probes (e.g., 10) have been unicast to the unresponsive neighbor. If the maximum number of probes has been sent, then the procedure may progress to steps 728 and 730 to invalidate the corresponding neighbor cache entries at the host and at the offload target device, respectively. Otherwise, the procedure may progress to step 722 to reset the invalidate timer so that, for example, there is a delay before the next Neighbor Solicitation message is sent at step 720. In an embodiment of the invention, the offload target device may operate independent of Neighbor Solicitation probing except its involvement in steps 704 and 706.

Example data structures and functions in accordance with an embodiment of the invention are now described in greater detail below.

An offload target may call the NdisMOffloadEventIndicate function to indicate various events to the host stack:

```
VOID NdisMOffloadEventIndicate(
    IN NDIS_HANDLE NdisMiniportHandle,
    IN PNDIS_MINIPORT_OFFLOAD_BLOCK_LIST OffloadBlockList,
    IN ULONG IndicationCode
);
``` where NdisMiniportHandle specifies the handle that the offload target obtained in a previous call to NdisMRegisterMiniport, and OffloadBlockList specifies a pointer to an NDIS_MINIPORT_OFFLOAD_BLOCK_LIST structure. This structure identifies the offloaded state object on which the indication is being made. Note that there is only one NDIS_MINIPORT_OFFLOAD_BLOCK_LIST structure. There is not a linked list of such structures. The offload target supplies a valid OffloadBlockList pointer when making a NeighborReachabilityQuery indication. In this case, the offload target supplies a NEIGHBOR_OFFLOAD_STATE_CONST structure, a NEIGHBOR_OFFLOAD_STATE_CACHED structure, and a NEIGHBOR_OFFLOAD_STATE_DELEGATED structure (in that order) immediately following the NDIS_MINIPORT_OFFLOAD_BLOCK_LIST structure referenced by the OffloadBlockList pointer.

An offload target may initialize the following members of an NDIS_MINIPORT_OFFLOAD_BLOCK_LIST structure that it passes to the NdisMOffloadEventIndicate function: all members of the NDIS_OBJECT_HEADER structure, including Type, Revision, and Size. The offload target may initialize Type to NeighborOffloadState. The NextBlock pointer may be initialized to a non-NULL value if there is a next block; otherwise, it may be set to NULL. The DependentBlockList pointer may be set to NULL. The Status member may be set to NDIS_STATUS_SUCCESS.

The offload target is not required to initialize any other members of the NDIS_MINIPORT_OFFLOAD_BLOCK_LIST structure. For all indications other than the NeighborReachabilityQuery indication, the offload target may supply an OffloadBlockList pointer that is NULL.

IndicationCode may specifies the event being indicated as one of the following INDICATE_OFFLOAD_EVENT values:

NeighborReachabilityQuery, indicating that a neighbor cache entry (NCE) has become stale; or NeighborReachabilityInDoubt, indicating that neighbor reachability may be uncertain.

The host stack may use the NeighborReachabilityQuery indication to detect neighbor unreachability for IPv4 and IPv6. Note that the IPv6 neighbor unreachability algorithm can be much more robust than the traditional IPv4 ARP algorithm for detecting neighbor unreachability. Thus, the host stack may use the neighbor unreachability algorithm for both IPv4 and IPv6 to determine whether a specific neighbor state object (NSO) should be invalidated. In the case of IPv6, the host stack uses neighbor solicitation messages to perform address resolution (see RFC 2461). In the case of IPv4, the host stack uses ARP messages (see D. Plummer, "An Ethernet Address Resolution Protocol," RFC 826, Network Working Group, November 1982, for details).

When the host stack offloads a neighbor state object, it may supply values for the following two neighbor state variables:

HostReachabilityDelta (HRD). This may be a cached variable that is maintained by the host stack.

DeviceReachabilityDelta (DRD). This may be a delegated variable that is maintained by the offload target.

The offload target may then use these variables to calculate the following timestamps after the neighbor state object has been offloaded:

HostReachabilityTime (HRT). For example, HRT may be determined as device current time (DCT)−HRD.

DeviceReachbilityTime (DRT). For example, DRT may be determined as device current time (DCT)−DRD.

Advantageously, in an embodiment of the invention, only the DRT timestamp need be updated on a per-packet basis.

The host stack specifies the HRD and DRD values in units of ticks. The host stack may specify a number of ticks per second in a TicksPerSecond member of the NDIS_TASK_TCP_CONNECTION_OFFLOAD structure when the host stack sets OID_TCP_TASK_OFFLOAD. Determining HRT and DRT at the offload target may include scaling one or more of HRT, DRT, HRD and DRD based on the specified number of ticks per second.

For example, HRD, DRD, HRT, and DRT may be unsigned variables of unsigned integer (ULONG) length. Because of this, the above calculations may cause HRT and DRT to wrap. As a result, the offload target typically uses normal unsigned arithmetic (e.g., modular arithmetic) when making this calculation. In an embodiment of the invention, at the time that the neighbor state object is offloaded, HRD and DRD are equal. Thus HRT and DRT are also equal. As the offload target or host stack sends, for example, IP datagrams on the connection that uses the neighbor state object, the values of HRT and DRT may diverge.

Forward progress is made, for example, on a TCP connection when TCP segments that are received from the remote peer indicate that the remote peer is receiving segments from the offload target or the local host stack (see RFC 2461). Examples of such TCP segments are:

A TCP acknowledgement (ACK) received in response to a segment sent by the host stack or the offload target; and A TCP segment received with a sequence number that was generated in response to an ACK sent by host stack or the offload target.

In an embodiment of the invention, whenever an offload target receives confirmation of forward progress on a connection, it finds the neighbor state object used by the connection and sets the neighbor state object's DeviceReachabilityTime (DRT) to the device's current time (DCT). This effectively resets the DeviceReachabilityDelta (DRD) value to zero.

In an embodiment of the invention, before the host stack sends an IP datagram on an offloaded connection, it checks its own neighbor cache entry (NCE) for the connection. If the reachability state of the NCE is DELAY, the host stack may call the MiniportQueryOffload function of the offload target to query the DeviceReachabilityDelta (DRD) variable for the connection. The host uses the queried DRD value to determine whether its NCE should transition to the PROBE reachability state.

Before an offload target sends an IP datagram on an offloaded connection, it may perform the following test: determine if (DCT−DRT)>NCEStaleTicks and (DCT−HRT)>NCEStaleTicks). Note that the host stack may supply the NCEStaleTicks value when setting OID_TCP_TASK_OFFLOAD.

If the result of this test is true, the offload target may do the following: set DRD to DCT−DRT; and call the NdisMOffloadEventIndicate function with an IndicationCode of NeighborReachabilityQuery. The offload target may also pass an OffloadBlockList pointer to the NdisMOffloadEventIndicate function. This pointer may reference a single NDIS_MINIPORT_OFFLOAD_BLOCK_LIST structure that is immediately followed by:

A NEIGHBOR_OFFLOAD_STATE_CACHED structure. This structure may contain the HostReachabilityDelta (HRD) variable.

A NEIGHBOR_OFFLOAD_STATE_DELEGATED structure. This structure may contains the DeviceReachabilityDelta (DRD) variable.

In the call to NdisMOffloadEventIndicate, the offload target may supply the current value of the DRD variable and the HRD variable for the neighbor state object. In response to a NeighborReachabilityQuery indication, the host stack may synchronously return a value for the neighbor's HRD variable. The offload target uses the HRD value to update HRT (HRT=DCT−HRD). The offload target may perform this same calculation after the neighbor state object is offloaded.

In an embodiment of the invention, the value of HostReachabilityDelta (HRD) depends on whether the host stack's neighbor cache entry (NCE) for the neighbor is stale. If the host stack's NCE is stale, the host stack may return a value of zero for HRD. This causes the offload target's HostReachabilityTime (HRT) to be equal to DCT, which prevents the offload target from making another NeighborReachabilityQuery indication for at least NCEStaleTicks. The NeighborReachabilityQuery indication prompts the host stack to start a timer. When that timer expires, the host stack may query the offload target's DeviceReachabilityDelta (DRD) value for the NCE.

If the offload target has received confirmation of forward progress on the connection since it made the NeighborReachabilityQuery indication, it will have updated the DeviceReachabilityTime (DRT) value. This will cause the queried value of DRD to be less than the value of DRD that was supplied by the offload target in the NeighborReachabilityQuery indication. The host stack may use the queried value of DRD to update its copy of the HostReachabilityDelta (HRD) value.

If the offload target has not received confirmation of forward progress on the connection since it made the NeighborReachabilityQuery indication, the value of the queried NRD variable may be greater than the value of NRD that is supplied by the offload target in the NeighborReachabilityQuery indication. In this case, the host stack may send unicast Neighbor Solicitation probes to verify reachability of the neighbor. In an embodiment of the invention, if the host stack does not receive a Neighbor Advertisement message in response to the probes, it invalidates its copy of the NCE and also invalidates the offload target's copy of the NCE by causing NDIS to call the offload target's MiniportInvalidateOffload function.

If the NCE for the host stack is in the REACHABLE state, the host stack may return a non-zero value for HRD, which the offload target may use to update its value for HostReachabiltyTime (e.g., HRT=DCT−HRD) and DeviceReachabilityTime (e.g., DRT=DCT−DRD).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. At least one computer-readable storage medium having stored thereon computer-executable instructions that, when executed by at least one processor, perform a method for maintaining and synchronizing information on reachability of a neighbor by a device and a host that offloads at least part of a communication protocol stack to the device, the method comprising:

determining, at the device to which the host offloads the at least part of the communication protocol stack, a device reachability delta based on a device reachability time comprising a time that reachability of the neighbor was last confirmed by the device, wherein the device and the host can send packets to the neighbor;

in response to determining that the device reachability delta is greater than a threshold, obtaining the information on reachability of the neighbor from the host by:

querying the host for a host reachability delta, the host reachability delta is determined based on a host reachability time comprising a time that reachability of the neighbor was last confirmed by the host; and in response to querying the host, receiving the host reachability delta from the host; and updating the device reachability time based on the host reachability delta received from the host.

2. Said at least one computer-readable medium of claim 1, wherein:

the computer-executable instructions when executed by the at least one processor further perform retrieving the device reachability time from a neighbor state object; and determining the device reachability delta comprises determining the device reachability delta as a function of, at least, the device reachability time.

3. Said at least one computer-readable medium of claim 2, wherein determining the device reachability delta comprises:

determining a difference between a current time and the device reachability time; and applying a scaling function to compensate for differences between a clock of the host and a clock of the device.

4. Said at least one computer-readable medium of claim 2, wherein:
- the neighbor state object is a device neighbor state object maintained by the device, wherein the device comprises an offload target;
- a host neighbor state object corresponding to the device neighbor state object is maintained by the host; and
- each neighbor state object references a corresponding neighbor cache entry.

5. Said at least one computer-readable medium of claim 1, wherein querying the host comprises providing the device reachability delta to the host.

6. Said at least one computer-readable medium of claim 5, wherein the computer-executable instructions when executed by the at least one processor further perform:
- updating a host reachability time as a function of, at least, the device reachability delta provided by the query; and
- determining the host reachability delta as a function of, at least, the updated host reachability time.

7. Said at least one computer-readable medium of claim 6, wherein updating the host reachability time as a function of, at least, the device reachability delta provided by the query comprises setting the host reachability time to a maximum of a set of values comprising:
- a current host reachability time; and
- a difference between a current time and the device reachability delta provided by the query.

8. Said at least one computer-readable medium of claim 6, wherein the computer-executable instructions when executed by the at least one processor further perform updating a neighbor cache entry state if the device reachability delta is greater than a threshold.

9. Said at least one computer-readable medium of claim 1, wherein the computer-executable instructions further comprise:
- determining the host reachability delta;
- determining a neighbor cache entry state;
- if the neighbor cache entry state is REACHABLE,
  - responding to the query with the determined host reachability delta; and otherwise, at least:
  - setting an invalidate timer; and
  - responding to the query with a nonstandard host reachability delta value.

10. Said at least one computer-readable medium of claim 9, wherein the computer-executable instructions further comprise querying an offload target for the device reachability delta in response to a triggering of the invalidate timer.

11. Said at least one computer-readable medium of claim 10, wherein tile computer-executable instructions further comprise:
- receiving the device reachability delta from the offload target;
- updating a host reachability time as a function of, at least, the device reachability delta;
- re-determining the host reachability delta as a function of, at least, the host reachability time;
- if the re-determined host reachability delta exceeds the threshold, updating a neighbor cache entry state in accordance with a threshold exceeded event; and
- otherwise, updating the neighbor cache entry state in accordance with a beneath threshold event.

12. Said at least one computer-readable medium of claim 11, wherein the computer-executable instructions further comprise:
- sending a Neighbor Solicitation probe if the neighbor cache entry state is PROBE: and
- if no response is received to the Neighbor Solicitation probe and a maximum number of Neighbor Solicitation probes has been sent, invalidating the neighbor cache entry.

13. In a system comprising a device and a host that offloads at least part of a communication protocol stack to the device, a method for maintaining and synchronizing information on reachability of a neighbor by the device and the host, the method comprising:
- determining, at the device to which the host offloads the at least part of the communication protocol stack, a device reachability delta based on a device reachability time comprising a time that reachability of the neighbor was last confirmed by the device, wherein the device and the host can send packets to the neighbor;
- in response to determining that the device reachability delta is greater than a threshold, obtaining the information on reachability of the neighbor from the host by:
- querying the host for a host reachability delta, the host reachability delta is determined based on a host reachability time a comprising a time that reachability of the neighbor was last confirmed by the host; and
- in response to querying the host, receiving the host reachability delta from the host; and updating the device reachability time based at least on the host reachability delta received from the host.

14. The method of claim 13, further comprising: retrieving the device reachability time from a neighbor state object, wherein determining the device reachability delta comprises determining a difference between a current time at the device and the device reachability time.

15. The method of claim 13, further comprising:
- updating a host reachability time at the device as a function of at least the host reachability delta.

* * * * *